(12) United States Patent
Fleming et al.

(10) Patent No.: US 9,778,369 B2
(45) Date of Patent: Oct. 3, 2017

(54) PEDESTRIAN POSITIONING IN HIGH-REFLECTION ENVIRONMENTS

(71) Applicant: Intel Corporation

(72) Inventors: Peter Fleming, Newbury (GB); Geraint Ffoulkes-Jones, Daventry (GB); Gerald Whitworth, Northampton (GB)

(73) Assignee: INTEL CORPORATION, Santa Clara, CA (US)

( * ) Notice: Subject to any disclaimer, the term of this patent is extended or adjusted under 35 U.S.C. 154(b) by 616 days.

(21) Appl. No.: 14/309,985

(22) Filed: Jun. 20, 2014

(65) Prior Publication Data
US 2014/0375494 A1    Dec. 25, 2014

(30) Foreign Application Priority Data
Jun. 20, 2013   (EP) .................................... 13173076

(51) Int. Cl.
*G01S 19/42*   (2010.01)
*G01S 5/02*    (2010.01)
(Continued)

(52) U.S. Cl.
CPC .......... *G01S 19/428* (2013.01); *G01S 5/0273* (2013.01); *G01S 19/22* (2013.01); *G01S 19/26* (2013.01);
(Continued)

(58) Field of Classification Search
CPC ...... G01S 19/428; G01S 19/22; G01S 5/0273; G01S 19/26; G01S 19/28; G01S 19/46; G01S 19/47; G01S 19/52
See application file for complete search history.

(56) References Cited

U.S. PATENT DOCUMENTS 7,266,140 B1   9/2007   Hasegawa et al.
9,075,139 B2   7/2015   Mizuochi et al.
(Continued)

FOREIGN PATENT DOCUMENTS

CA   WO 2013142946 A1 * 10/2013 ............. G01S 19/25
CN       1299976 A      6/2001
(Continued)

OTHER PUBLICATIONS

Office Action received for Chinese Patent Application No. 201410277939.2 mailed on Mar. 3, 2016, 9 pages of office action and 16 pages of English translation.
(Continued)

*Primary Examiner* — Cassie Galt
(74) *Attorney, Agent, or Firm* — Viering, Jentschura & Partner mbB (57) ABSTRACT

A positioning system operates by first determining that a user is pedestrian, and then estimating a speed of the user. Having tracked a first signal from one radio transmitter whose position is known, the system attempts to detect additional signals from the one transmitter, in a search space such that the first signal and the or each additional signal are consistent with the estimated speed of the user and with one or more of the signals having been reflected off a reflector in the vicinity of the user. One or more detected additional signals from the one transmitter are then tracked, and candidate measurements, derived from the first signal and the one or more detected additional signals, are provided for use when estimating the position and/or velocity of the user.

20 Claims, 5 Drawing Sheets

(51) Int. Cl.
- *G01S 19/22* (2010.01)
- *G01S 19/26* (2010.01)
- *G01S 19/28* (2010.01)
- *G01S 19/52* (2010.01)
- *G01S 19/46* (2010.01)
- *G01S 19/47* (2010.01)

(52) U.S. Cl.
CPC .............. *G01S 19/28* (2013.01); *G01S 19/46* (2013.01); *G01S 19/47* (2013.01); *G01S 19/52* (2013.01)

(56) References Cited

U.S. PATENT DOCUMENTS

| | | | |
|---|---|---|---|
| 2008/0238772 A1* | 10/2008 | Soloviev | G01S 19/22 342/357.25 |
| 2012/0038508 A1 | 2/2012 | Mizuochi et al. | |
| 2013/0113656 A1 | 5/2013 | Vervisch-Picois et al. | |
| 2013/0304414 A1* | 11/2013 | Levy | G01C 22/006 702/141 |

FOREIGN PATENT DOCUMENTS

| | | |
|---|---|---|
| CN | 1750435 A | 3/2006 |
| CN | 201532466 U | 7/2010 |
| CN | 102375147 A | 3/2012 |
| JP | 2001-264409 A | 9/2001 |
| JP | 2008-051572 A | 3/2008 |
| JP | 2008-139105 A | 6/2008 |
| JP | 2012-042246 A | 3/2012 |
| JP | 2012-203721 A | 10/2012 |
| WO | 02/052225 A2 | 7/2002 |
| WO | 2012/001665 A1 | 1/2012 |

OTHER PUBLICATIONS

Office Action received for Japanese Patent Application No. 2014-126026 mailed on May 12, 2015, 3 pages of office action and 3 pages of English translation.

Extended European Search Report received for European Patent Application No. 13173076.4, mailed Oct. 17, 2013, 7 pages.

* cited by examiner

PEDESTRIAN POSITIONING IN HIGH-REFLECTION ENVIRONMENTS

TECHNICAL FIELD

This invention relates to a positioning system, and in particular to a positioning system for pedestrian users.

BACKGROUND

Navigation and positioning systems are in common use, for example using one of the available Global Navigation Satellite Systems (GNSS), such as the Global Positioning System (GPS). In such systems, a user device receives signals from multiple satellite vehicles, each of which has a predetermined trajectory. As a result, the user device is able to make measurements on the received signals, and is able to use these to provide estimates of the user's position and velocity.

One well-known problem with such systems is that signals from the satellite vehicles can arrive at the user device after being reflected off, or refracted by, obstacles that are in the line-of-sight path between the satellite vehicle and the user device or are close to the line-of-sight path. These obstacles can also have the effect that the direct line-of-sight signal is attenuated significantly, possibly to the extent that the user device is practically unable to receive it.

The effect of this problem can be that the user device is unable to make good estimates of the user's position and velocity.

US-2008/0238772-A describes a positioning system, for use in an urban environment in which there are many potential obstacles such as tall buildings. In the described system, the positions of the buildings are stored in the system. The position of the device is then determined by using signals from an inertial navigation system, and from a satellite positioning system, with the satellite positioning system predicting the characteristic of a multipath signal reflected off one of the known obstacles. This requires detailed knowledge of the locations of the potential obstacles.

SUMMARY

According to the present invention, there is provided a method of operating a positioning system that includes determining that a user is pedestrian and estimating a speed of the user. The method involves tracking a first signal from one radio transmitter whose position is known, and then attempting to detect additional signals from that transmitter, in a search space such that the first signal and the or each additional signal are consistent with the estimated speed of the user and with one or more of the signals having been reflected off a reflector in the vicinity of the user. One or more detected additional signals from the one transmitter are tracked, and candidate measurements, derived from the first signal and the one or more detected additional signals, are provided for use when estimating the position and/or velocity of the user.

The search space is such that the magnitude of the difference between the measured frequency of said first signal and the measured frequency of said additional signal is less than the Doppler shift corresponding to twice the estimated speed of the user.

The method may comprise attempting to detect additional signals from the one transmitter, in a search space such that the first signal and the or each additional signal are consistent with the estimated speed of the user and with one or more of the signals having been reflected off a reflector in the vicinity of the user, by determining, for each detected additional signal, whether the magnitude of a difference between a pseudorange derived from said first signal and a pseudorange derived from said additional signal is less than twice the estimated maximum distance of the user from a possible reflector.

The determination that the user is pedestrian may be based on an inertial sensor signal. The inertial sensor may comprise an accelerometer, and the method may then comprise determining that the user is pedestrian based on a determination that acceleration signals from the accelerometer are consistent with the user being pedestrian; or the inertial sensor may comprise a gyroscope, and the method may then comprise determining that the user is pedestrian based on a determination that rotation rate signals or rotation signals from the gyroscope are consistent with the user being pedestrian. The inertial sensor may further comprise a magnetometer.

The candidate measurements may comprise a pseudorange measurement to the radio transmitter, a Doppler measurement to the radio transmitter, and/or a carrier phase measurement to the radio transmitter.

A quality indicator associated with the candidate measurements may be provided, and the method may then comprise estimating the position and/or velocity of the user using one measurement, selected from the candidate measurements, and comprising selecting the one measurement based on the quality indicator.

The method may comprise estimating the position and/or velocity of the user using one measurement, selected from the candidate measurements, with the one measurement being selected based on consistency with measurements derived from signals received from other radio transmitters.

The method may comprise estimating the position and/or velocity of the user using one measurement, selected from the candidate measurements, with the one measurement being selected based on respective pseudoranges derived from the candidate measurements.

The estimation of the speed of the user may be based on an estimated step frequency of the user.

According to a second aspect of the invention, there is provided a positioning system, comprising a sensor, for providing a signal that can be used to determine whether a user is pedestrian; and at least one processor, for performing a method according to the first aspect.

BRIEF DESCRIPTION OF THE DRAWINGS

Preferred embodiments will now be described, by way of example only, with reference to the accompanying drawings, in which.

DETAILED DESCRIPTION

Figure 1:
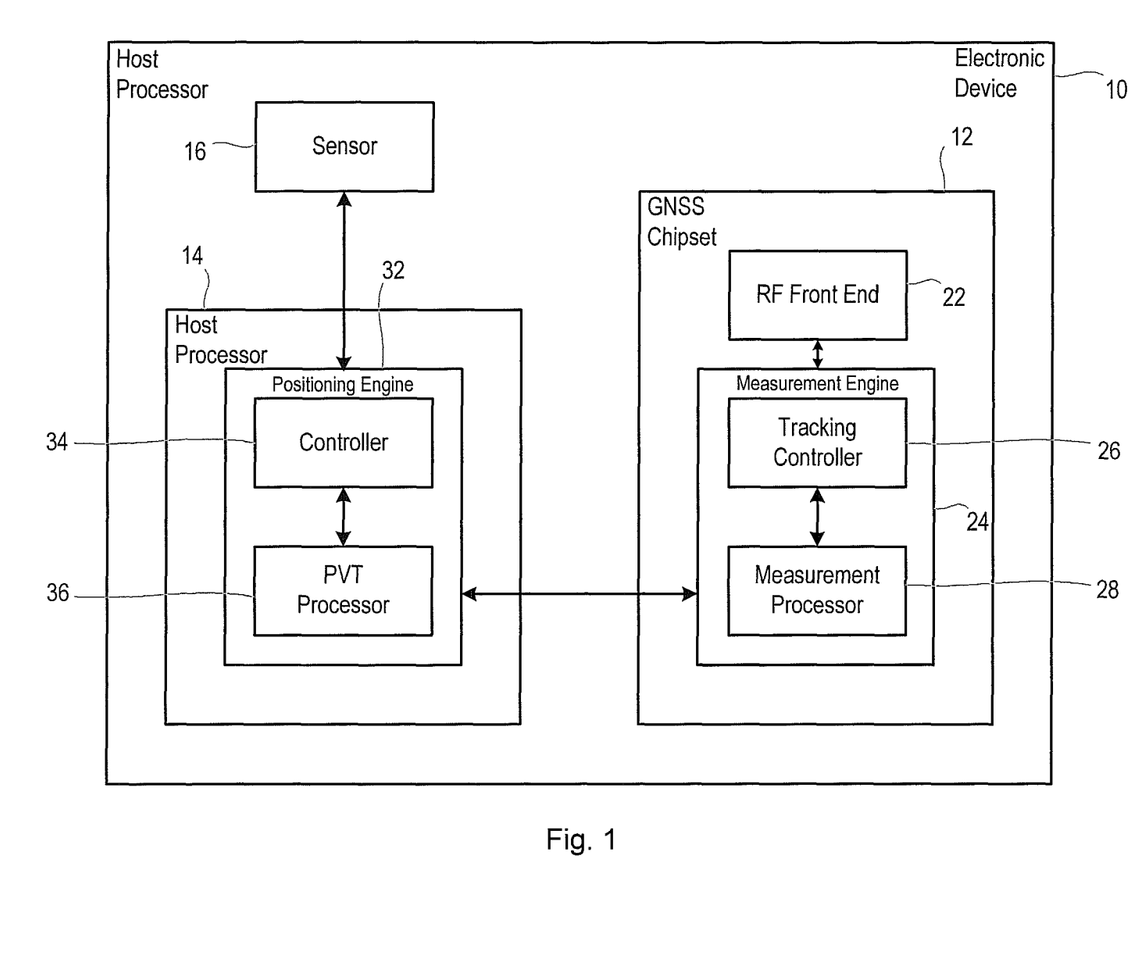
FIG. 1 is a schematic block diagram of an electronic device including a navigation and positioning system.

FIG. 1 illustrates a navigation and positioning system provided in an electronic device 10. As an example, the electronic device 10 might be a smartphone, tablet or notebook computer or the like, or might be a specialised tracking device.

The navigation and positioning system is shown in FIG. 1 as being divided between multiple separate processing devices. In one example, the electronic device 10 includes a Global Navigation Satellite System (GNSS), for example a Global Positioning System (GPS), chipset 12 and a host processor 14 that is also used to provide other required functionality of the electronic device 10.

The electronic device 10 also includes at least one additional sensor 16, as described in more detail below.

The GNSS chipset 12 includes a radio frequency (RF) front end circuit 22, for receiving signals transmitted by satellite vehicles. Received signals are passed to software in the form of a measurement engine 24, which can be thought of as comprising a tracking controller 26 and a measurement processor 28. The tracking controller 26 controls the operation of the RF front end circuit so that it receives the intended signals from the satellite vehicles, and the measurements required for determining the position and velocity of the device are extracted by the measurement processor 28.

The host processor 14 runs software in the form of a positioning engine 32, which includes a controller 34 and a position-velocity-time (PVT) processor 36. The controller 34 coordinates the positioning engine 32 and the measurement engine 24, while the PVT processor 36 calculates an estimate of the position and velocity of the device, and the time, using the measurements received from the GNSS chipset 12 and from the additional sensor 16. While the invention is described herein with reference to its use in a GNSS satellite navigation and positioning system, it can equally be used in other systems in which a device receives signals from transmitters whose position (and velocity, if appropriate) is known. For example, such transmitters might take the form of GNSS pseudolites, Indoor Messaging System (IMES) transmitters, Bluetooth transmitters, WiFi transmitters, cellular wireless transmitters, or near field communication (NFC) transmitters.

As is generally understood, the RF front end circuit 22 is controlled so that it receives signals from multiple transmitters, such as satellite vehicles in the illustrated example. Measurements are extracted from these signals by the measurement engine 24, and supplied to the positioning engine 32, which then calculates an estimate of the position and velocity of the device, and the time.

Typically, the measurements relate to the times at which signals are received by the receiver. If the receiver has a clock that is known to be completely synchronised to the satellites' time, the time at which a signal is received will indicate the distance of the receiver from the satellite vehicle, i.e. the range. By obtaining range measurements from three or more satellite vehicles, the position of the receiver can be calculated. In practice, most navigation devices do not have such a clock, and so the time offset is one of the parameters that is sought to be calculated, by using additional measurements relating to the times at which signals are received. Range measurements computed using an un-synchronised receiver clock are referred to as pseudoranges. Typically, pseudorange measurements from four or more satellite vehicles are used to calculate the three-dimensional position of the receiver together with the receiver clock time offset.

The measurements may also relate to the phase of the carrier wave of each signal received from a satellite. This provides additional information that can be used when calculating the position and velocity of the device, and the time.

The movement of the device 10 causes Doppler effects in the signals received by the receiver. That is, the frequency of received signals can be compared with the frequency of a local oscillator in the RF front end circuit 22. The apparent frequency of the received signals is shifted by an amount that depends on the component of the speed of movement of the device towards or away from the satellite. It also depends on the error of the frequency of the local oscillator relative to the satellites' time-frame. The effect of the local oscillator's frequency error on the Doppler measurements is analogous to the effect of the receiver's time offset on the range measurements. However, the Doppler measurements are usually still referred to as 'Doppler' rather than 'pseudo-Doppler'. The Doppler measurements can be used to calculate the velocity of the movement of the device 10. Typically, Doppler measurements from four or more satellite vehicles are used to calculate the three-dimensional velocity of the receiver together with the receiver clock frequency offset. It is also possible to use repeated Doppler measurements to determine the position of the device 10. For example, if the Doppler measurements at one time are used to calculate the velocity of the device 10, this can be used to estimate the movement of the device in the period until the next Doppler measurements are taken, and successive repetitions of this process can be used to obtain an estimate of the path followed by the device.

Figure 2A:
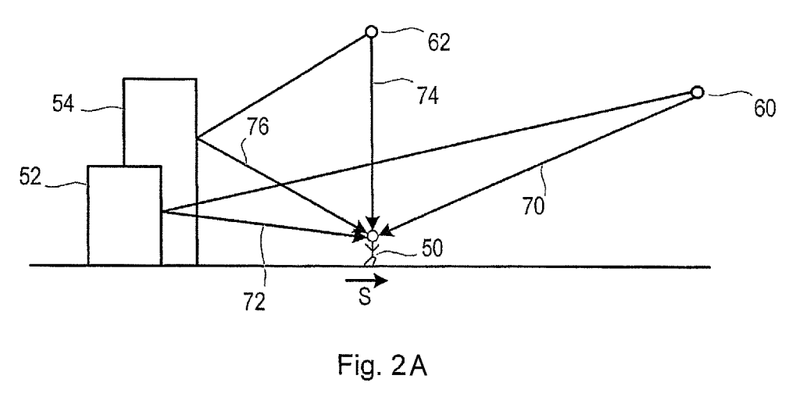
FIGS. 2A and 2B illustrate a possible deployment of the system of FIG. 1.
Figure 2B:
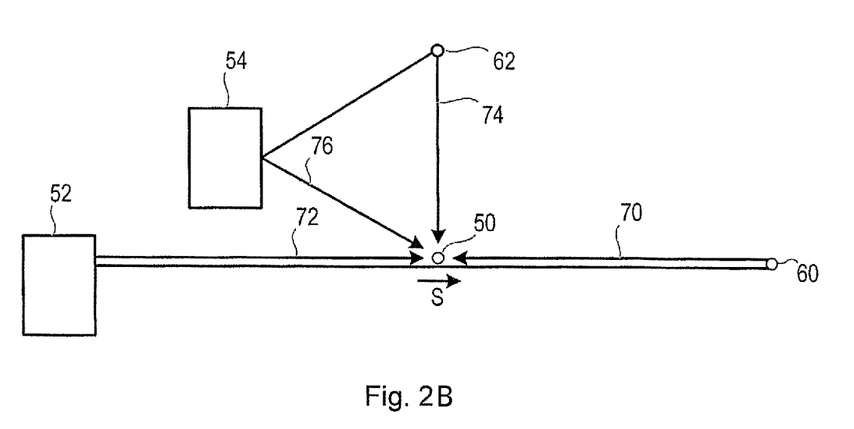

FIGS. 2A and 2B illustrate a situation in which the electronic device 10 may be used.

Specifically, FIG. 2A is a side view of a user 50 who is moving at a speed S in an urban environment containing buildings 52, 54, while FIG. 2B is a view from above. It is assumed here that the user 50 is carrying or wearing an electronic device 10 of the type shown in FIG. 1. FIGS. 2A and 2B show the user 50 being in a position to receive signals from two satellite vehicles 60, 62. It will be recognised that it is usually necessary to receive signals from at least four satellite vehicles in order to be able to obtain an accurate estimate of the position and velocity of the device, and the receiver clock time and frequency offsets, but only two satellite vehicles are shown in FIGS. 2A and 2B for reasons of clarity, and because this is sufficient to illustrate the operation of the invention.

FIGS. 2A and 2B shows a line-of-sight signal 70 being received by the user 50 from the first satellite vehicle 60, and also shows a signal 72 being received by the user 50 from the first satellite vehicle 60 after reflection off the building 52. FIGS. 2A and 2B also shows a line-of-sight signal 74 being received by the user 50 from the second satellite vehicle 62, and also shows a signal 76 being received by the user 50 from the second satellite vehicle 62 after reflection off the building 54.

As mentioned above, the user 50 is moving at a speed S, in a direction that is on the straight line between the building 52 and the position on the ground directly below the first satellite vehicle 62, towards the first satellite vehicle 62.

The movement of the vehicle 50 causes Doppler effects on the signals received by the GNSS chipset 12, and these effects can be used to generate Doppler measurements. A Doppler measurement is taken in general terms to mean a rate of change of the pseudorange of the user from the satellite vehicle. This discussion assumes that the Doppler effects caused by movement of the satellite vehicle have been removed. However, it is assumed that each Doppler measurement will still be subject to error caused by an offset in the frequency of the signals generated by the oscillator in the RF front end circuit of the GNSS chipset.

Figure 3:
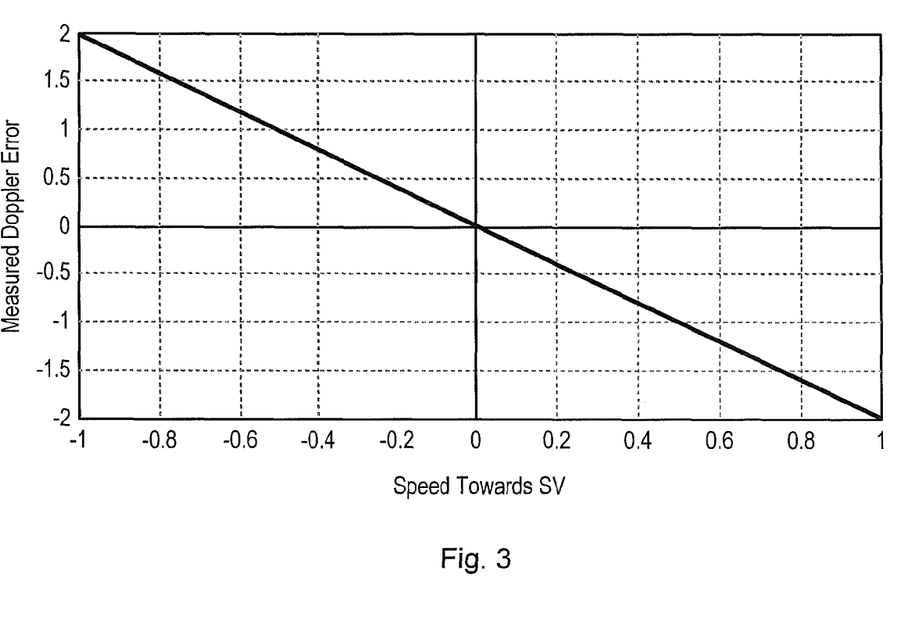
FIG. 3 illustrates the effects of reflection on a signal received by the navigation and positioning system in one special case.

FIG. 3 illustrates the effect of multipath on the Doppler measurements in a special case. Specifically, FIG. 3 illustrates the error in the Doppler measurements that can be obtained by the user 50 from the first satellite vehicle 60 in the situation shown in FIGS. 2A and 2B.

As described above, FIGS. 2A and 2B show a situation in which the user 50 is moving with speed S along the straight line that extends between the satellite vehicle 60 and the reflector 52. (In this illustration, a positive value of S represents movement towards the satellite vehicle 60, while a negative value of S represents movement away from the satellite vehicle 60 towards the building 52 that is reflecting the signal.) The Doppler measurements relate to the change in the distance travelled by the signal between successive measurements.

Therefore, when the user 50 is moving towards the satellite vehicle 60, that is, to the right in FIGS. 2A and 2B, the real distance between the user 50 and the first satellite vehicle 60 is reducing. However, the distance travelled by the reflected signal 72 is increasing, which would normally suggest that the user 50 is moving away from the satellite vehicle 60. More specifically, when the user 50 is moving towards the satellite vehicle 60 at the speed S, the Doppler measurement indicates that the user 50 is moving away from the satellite vehicle 60 at the speed S. There is thus an error in the sign of the velocity obtained from the Doppler measurement, and an error of 2S in the magnitude of the velocity obtained from the Doppler measurement.

FIG. 3 illustrates this situation graphically, for speeds (expressed in suitable units) in the range from −1 to +1. For any given speed, the error in the velocity obtained from the Doppler measurement is of the opposite sign and has a magnitude of twice the speed.

FIG. 3 applies to the special case in which the user 50 is moving along the straight line that extends between the satellite vehicle 60 and the reflector 52. In the more general case, the position of the reflector will not be known. Further, while the speed of movement of the user may be known from the additional sensor(s) 16 on the electronic device, the direction of movement may not be known.

Figure 4:
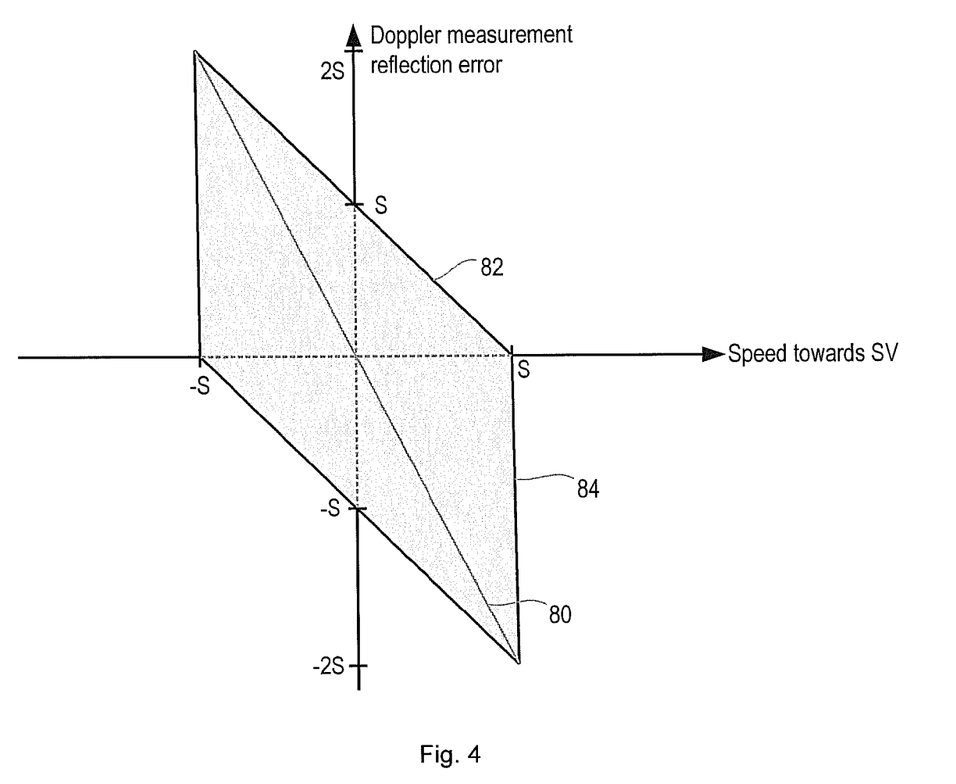
FIG. 4 illustrates the effects of reflection on a signal received by the navigation and positioning system in a more general case.

FIG. 4 illustrates the error in the velocity that may be obtained from the Doppler measurement in that more general situation.

FIG. 4 assumes that the electronic device 10 includes at least one additional sensor 16 that can be used to estimate the speed of the user 50. The additional sensor may include an accelerometer, and may additionally include a gyroscope and/or a magnetometer. Thus, the speed of the user 50 can be estimated.

It is advantageous to be able also to estimate the direction of motion of the user 50, but this is not essential. It is not a requirement that the electronic device 10 should be fixed to the user 50 in any fixed or predetermined orientation, and so the additional sensor 16 cannot use information about the orientation of the sensor 16 relative to the user 50 to make any determination about the direction of motion of the user 50.

Thus FIG. 4 shows a situation in which the user is known to be moving with a speed S, but the direction of motion of the user is not assumed to be known. Specifically, no assumption is made about the direction of movement of the user relative to the position of the satellite vehicle, or about the position of the reflector relative to the line-of-sight between the satellite vehicle and the user. (For the purposes of illustration, this corresponds to the situation in FIG. 2B, in which the user is receiving the reflected signal 76 from the second satellite vehicle 62.) This also applies to the cases where the reflector is three-dimensional, and/or has a curved surface.

In FIG. 4, the horizontal axis represents the component of the velocity of the user in the direction towards a satellite vehicle from which a reflected signal is being received.

Thus, if the user is travelling at the speed S towards the satellite vehicle, this represents a velocity of +S, while if the user is travelling at the speed S directly away from the satellite vehicle, this represents a velocity of −S. Movement in other directions will represent intermediate velocities. For example, if the user is travelling at the speed S in a direction that is perpendicular to the direction of the satellite vehicle, its velocity in the direction towards the satellite vehicle will be zero.

In FIG. 4, the vertical axis represents the error in the Doppler measurement caused by the reflection. The Doppler measurement is assumed to be indicating the change in the user's position relative to the satellite vehicle. However, when it is the reflected signal that is being tracked, the Doppler measurement is actually indicating the change in the user's position relative to the reflector. Thus, an error is caused by the fact that the movement of the user causes a change in the user's position relative to the reflector that is different from the change in the user's position relative to the satellite vehicle.

FIG. 4 shows the range of possible errors, for different directions of travel of the user, and for different positions of the reflector. For example, the line 80 corresponds to the special case illustrated in FIG. 3, in which the user is positioned directly between the satellite vehicle and the reflector, and there is thus an error in the sign of the velocity obtained from the Doppler measurement, and an error in the magnitude of the velocity obtained from the Doppler measurement, with the magnitude of the error being equal to twice the component of the velocity in the direction towards the satellite vehicle.

As another example, the line 82 corresponds to the range of cases in which the user is moving directly towards the reflector, and thus the user's speed has a component (in the range from 0 to S) in the direction towards the satellite vehicle, but has a speed of S in the direction towards the reflector, and so the Doppler measurement overestimates the user's velocity.

As a further example, the line 84 corresponds to the cases in which the user is moving directly towards the satellite vehicle (and therefore has a speed S in that direction), for different positions of the reflector. Thus, a reflector directly "behind" the user (as seen from the satellite vehicle) causes an error of −2S in the Doppler measurement, while a reflector that is directly adjacent to the line-of-sight path between the satellite vehicle and the user causes a very small error in the Doppler measurement.

It is important for the purposes of the method described herein to recognise that, when the user's speed is zero, the presence of a reflector causes no error in the Doppler measurement. (This is ignoring the small effects due to the change in geometry of the satellite-reflector-receiver resulting from the motion of the satellite.) It is also important to recognise that, regardless of the user's direction of movement, and regardless of the shape and position of the reflector, the error in the Doppler measurement lies within the shaded parallelogram in FIG. 4.

Figure 5:
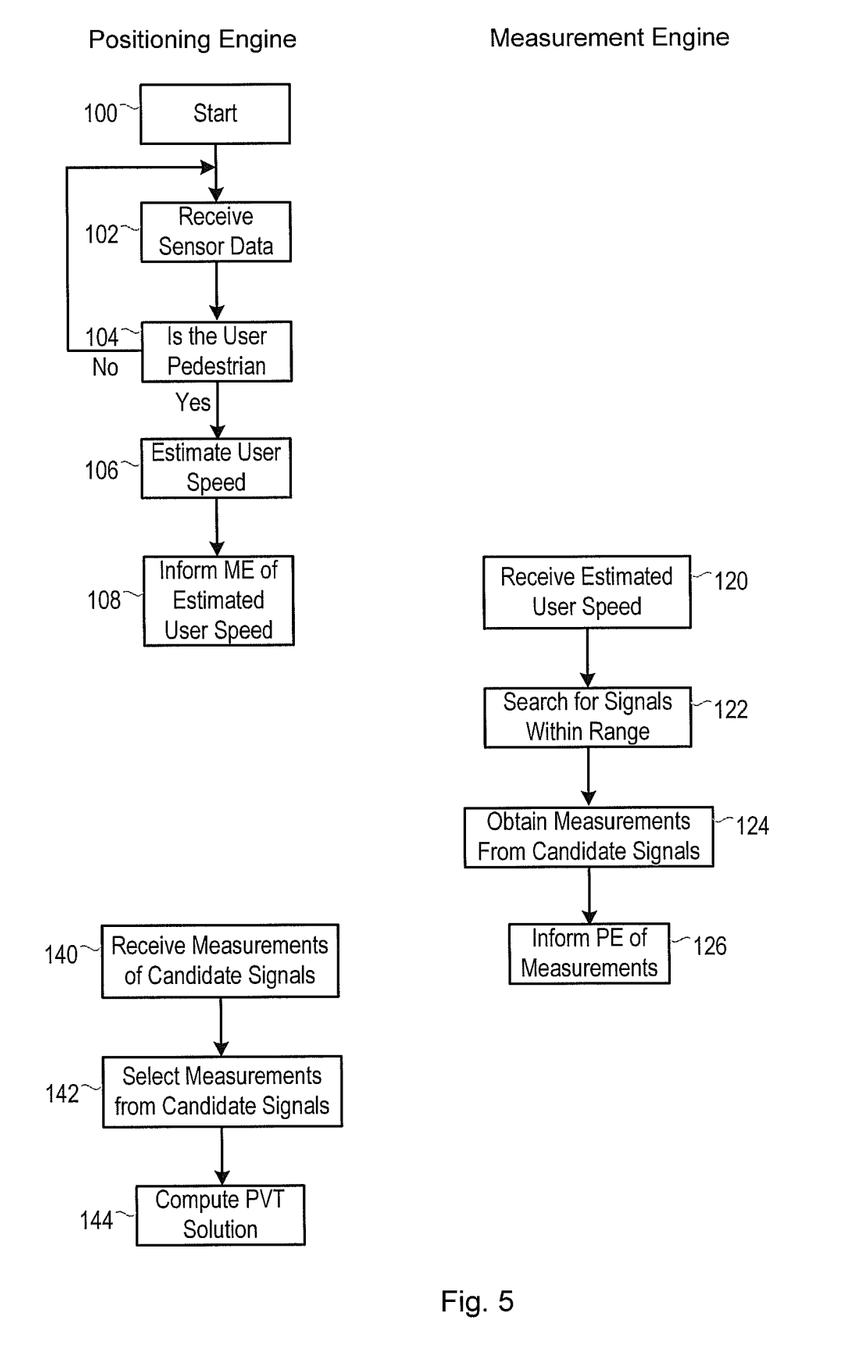
FIG. 5 is a flow diagram illustrating a method performed by the navigation and positioning system.

FIG. 5 is a flow chart, illustrating a method in accordance with an embodiment of the invention. In FIG. 5, it is assumed that the process is split between a measurement engine and a positioning engine, in a system of the general type shown in FIG. 1. However, it will be appreciated that the method can be performed in a single device, or can be split between different devices in different ways from that illustrated in FIG. 5.

The process of FIG. 5 starts at step 100, and in step 102 the positioning engine (PE) receives data from the additional sensor(s) 16 of the electronic device. As mentioned above, the additional sensor(s) may be inertial sensor(s), such as an accelerometer, and/or a gyroscope and/or a magnetometer.

In step 104, the PE determines from the sensor data whether the user is likely to be pedestrian, for example whether the user is walking or running. As is known to the person skilled in the art, such a determination can be based on signals received from an inertial sensor, for example by determining that acceleration signals from the sensor are consistent with the user being pedestrian, and/or by determining that rotation signals from a sensor are consistent with the user being pedestrian, and/or by determining that rotation rate signals from a sensor are consistent with the user being pedestrian.

In step 106, the PE determines from the sensor data an estimate of the speed of movement of the user. For example, the speed of movement of the user might be estimated based on an estimated step frequency of the user. Depending on the sensor(s) provided on the electronic device, it may also be possible to obtain from the sensor data an estimate of the direction of movement of the device.

In step 108, the PE informs the measurement engine (ME) of its estimate of the speed of movement of the user and, if available, its estimate of the direction of movement of the device.

The ME receives the estimate of the speed of movement of the user and, if available, the estimate of the direction of movement of the device, in step 120.

In step 122, the tracking controller of the ME searches for signals meeting specified criteria. Unlike some systems, in which a measurement engine attempts to track the line-of-sight signal received from a satellite vehicle while identifying and disregarding any reflected signals, in this case the ME deliberately and intentionally attempts to track reflected signals from a satellite vehicle while tracking the line-of-sight signal from that satellite vehicle.

As described above with reference to FIG. 4, it is known that the error in the Doppler measurement, resulting from the presence of a reflector, is in the range −2S to +2S. That is, there is an uncertainty interval of four times the user speed. Thus, in step 122 the ME searches for signals that give a value for the speed, obtained from the Doppler measurement, that is within the range −2S to +2S, where S is the value of the speed estimated by the PE. More specifically, having identified a first signal from one satellite, and having identified at least one additional signal from that one satellite, it is determined, for the or each additional signal, whether the magnitude of the difference between the measured frequency of said first signal and the measured frequency of the additional signal is less than the Doppler shift corresponding to twice the estimated speed of the user.

In fact, if the ME also receives an estimate of the direction of movement of the device in step 120, the possible error in the Doppler measurement is smaller. Specifically, if the user speed in the direction of the satellite vehicle (Ssv) is known, as well as the user speed (S), then the reflector-induced Doppler error is in the range (Ssv−S) to (Ssv+S), and so there is an uncertainty interval of twice the user speed.

Thus, in step 122 of the method, the ME attempts to detect signals that have a speed, estimated from the Doppler measurement, that is within +/−2S of the user speed. For a pedestrian user, the speed would often be less than about 1.5 m/s (i.e. the additional Doppler search space would be about +/−15 Hz at GPS L1 frequency). Thus, a small additional search space can provide significant benefits.

It will also be apparent that the effect of a reflector will be that the measured pseudorange obtained using a reflected signal will be longer than that obtained using the direct signal by up to twice the distance between the user and the reflector. In the general case, the distance between the user and the reflector will not be known. However, the ME can place an upper value on the distance (and this could be variable, depending on how much hardware is available to the ME for searching purposes). For example, if it is assumed that the maximum distance between the user and the reflector is unlikely to be more than 500 metres, the difference between a direct-path pseudorange and a reflected-path pseudorange would be no more than 1000 metres. More generally, if we denote the assumed maximum distance between the user and the reflector by Dmax, then the maximum separation between a direct-path pseudorange and a reflected-path pseudorange is 2Dmax.

Thus, in one embodiment, when the environment is such that the ME is susceptible to tracking reflected signals, the ME in step 122 deliberately and intentionally starts searching for, and tracking if acquired, signals which are within the Doppler interval +/−2S of the estimated user speed S, and are within the pseudorange interval +/−2Dmax of the first signal acquired.

In step 124, the ME obtains candidate measurement sets for all such signals tracked, and in step 126 the ME provides the candidate measurement sets to the PE. Each measurement set may include some or all of: a pseudorange, a Doppler measurement and a carrier phase measurement. As noted above, the ME may be able to provide a candidate measurement set for a line-of-sight signal received by the user from the satellite vehicle, and the ME may be able to provide one or more additional candidate measurement set for one or more reflected signal received by the user from the same satellite vehicle. The ME should be able to provide such candidate measurement sets for signals received from multiple satellite vehicles. This differs from GNSS implementations in which the ME attempts to identify the line-of-sight signal and then provides the PE with measurements from only one signal for each satellite. In addition, the ME may also provide a quality indicator (based, for example, on the estimated Signal to Noise Ratio, or the shape of the correlation peak) associated with each candidate measurement set, for example indicating a probability that the candidate measurement set is derived from the line-of-sight signal.

In step 140, the PE receives the candidate measurements from the PE. In step 142, the PE examines the candidate measurements to try to distinguish line-of-sight signals from reflected signals. When the PE receives multiple candidate measurement sets from the PE, it may select one of the candidate measurement sets in preference to the others. For example, it will try to distinguish which of the candidate measurement sets relates to the line-of-sight signals while the others relate to reflected signals.

One example of a method by which the PE may try to distinguish line-of-sight signals from reflected signals uses the goodness of fit achieved by the respective candidate measurements. Usually, a PE will have more measurements available than are necessary in order to generate a unique solution for the position, and velocity of the user and the time (collectively referred to as a PVT solution). In such cases, a least-squares solution can be employed to find which sets of measurements give the best quality PVT solution. As an example, in the very simplest cases where the ME has produced two sets of candidate measurements for one satellite vehicle, but only one set of candidates for each other satellite vehicle, then the best candidate might be taken as being the one which fits best with all the other measurements.

Another example of a method by which the PE might select measurements from multiple candidate measurement sets uses the pseudorange delay. It will be recognised that, where a signal is reflected, the measured pseudorange will be longer than that of the corresponding direct signal. Therefore, if two candidate pseudorange measurements are available for a particular satellite vehicle then, all other things being equal, the shorter pseudorange is more likely to be from the direct path.

As a further example, quality indicators provided by the ME, if available, can be used to select one set of measurements from multiple candidate measurement sets.

Having selected one set of measurements from multiple candidate measurement sets derived from one or more of the satellite vehicles, the PE is then able in step 144 to compute a PVT solution using methods that will be known to the person skilled in the art.

As an alternative to the method described above, when the PE is provided with multiple sets of candidate measurements for a particular satellite, it can determine which of the candidate measurement sets is preferred, but may then take all of the measurements into account when computing the PVT solution, giving a higher weight to the preferred measurement set and a reduced weight to the less preferred measurement set or sets.

As a further alternative, when the PE is provided with multiple sets of candidate measurements for a particular satellite, it can ignore all the candidate sets for that satellite when computing the PVT solution.

There is thus described a method that allows the use of a navigation system, even in the presence of multipath signals.

The invention claimed is:

1. A method of operating a positioning system, the method comprising:
    determining that a user of the positioning system is a pedestrian;
    estimating a speed of the user;
    tracking a first signal from a radio transmitter whose position is known;
    detecting at least one additional signal from the radio transmitter using a search space defined to capture direct and reflected signals that is positioned based on a measured frequency of the first signal and the estimated speed of the user;
    tracking the at least one additional signal from the radio transmitter;
    obtaining candidate measurements from the first signal and the at least one additional signal; and
    estimating a position and/or velocity of the user based on the candidate measurements.

2. The method of claim 1, wherein the search space is defined such that the magnitude of the difference between the measured frequency of said first signal and a measured frequency of said at least one additional signal is less than the Doppler shift corresponding to twice the estimated speed of the user.

3. The method of claim 1, wherein detecting the at least one additional signal from the radio transmitter using the search space comprises:

identifying the first signal and a candidate signal;
determining that a difference between a measured frequency of the candidate signal and the measured frequency of the first signal is less than the Doppler shift corresponding to twice the estimated speed of the user;
determining that a difference between a pseudorange for the candidate signal and a pseudorange of the first signal is less than twice an estimated maximum distance of the user from a possible reflector; and
including the candidate signal in the at least one additional signals.

4. The method of claim 1, wherein determining that the user is a pedestrian is based on an inertial sensor signal.

5. The method of claim 4, wherein the inertial sensor comprises:
    an accelerometer; and the method further comprises
    determining that the user is a pedestrian is based on a determination that acceleration signals from the accelerometer are consistent with the user being a pedestrian.

6. The method of claim 4, wherein the inertial sensor comprises:
    a gyroscope; and
    determining that the user is a pedestrian is based on a determination that rotation rate signals from the gyroscope are consistent with the user being a pedestrian.

7. The method of claim 4, wherein the inertial sensor comprises:
    a gyroscope; and
    determining that the user is a pedestrian is based on a determination that rotation signals from the gyroscope are consistent with the user being a pedestrian.

8. The method of claim 4, wherein the inertial sensor further comprises a magnetometer.

9. The method of claim 1, wherein the candidate measurements comprise a pseudorange measurement to the radio transmitter.

10. The method of claim 1, wherein the candidate measurements comprise a Doppler measurement to the radio transmitter.

11. The method of claim 1, wherein the candidate measurements comprise a carrier phase measurement to the radio transmitter.

12. The method of claim 1, further comprising providing a quality indicator associated with the candidate measurements.

13. The method as claimed in claim 12, further comprising estimating the position and/or velocity of the user using one measurement selected from the candidate measurements, and comprising selecting the one measurement based on the quality indicator.

14. The method of claim 1, further comprising estimating the position and/or velocity of the user using one measurement selected from the candidate measurements, and comprising selecting the one measurement based on consistency with measurements derived from signals received from other radio transmitters.

15. The method of claim 1, further comprising estimating the position and/or velocity of the user using one measurement selected from the candidate measurements, and comprising selecting the one measurement based on respective pseudoranges derived from the candidate measurements.

16. The method of claim 1, further comprising estimating the speed of the user based on an estimated step frequency of the user.

17. A positioning system, comprising:

a sensor, for providing a signal that can be used to determine whether a user of the positioning system is a pedestrian; and at least one processor for performing a method comprising:

determining that the user is a pedestrian;

estimating a speed of the user;

tracking a first signal from a radio transmitter whose position is known;

detecting at least one additional signal from the radio transmitter using a search space defined to capture direct and reflected signals that is positioned based on a measured frequency of the first signal and the estimated speed of the user;

tracking the at least one additional signal from the radio transmitter;

obtaining candidate measurements, from the first signal and the at least one additional signal; and estimating a position and/or velocity of the user based on the candidate measurements.

18. The positioning system of claim 17, wherein the at least one processor is configured to detect the at least one additional signal from the radio transmitter using the search space by:

identifying the first signal and a candidate signal;

determining that a difference between a measured frequency of the candidate signal and the measured frequency of the first signal is less than the Doppler shift corresponding to twice the estimated speed of the user;

determining that a difference between a pseudorange for the candidate signal and a pseudorange of the first signal is less than twice an estimated maximum distance of the user from a possible reflector; and including the candidate signal in the at least one additional signals.

19. The positioning system of claim 17 wherein said positioning system is provided in an electronic device selected from a smartphone, a tablet and a notebook computer.

20. The positioning system of claim 17 wherein said positioning system is provided in an electronic device including at least one Global Navigation Satellite system (GNSS).

* * * * *